INVENTOR
ALAN F. WILLIAMS

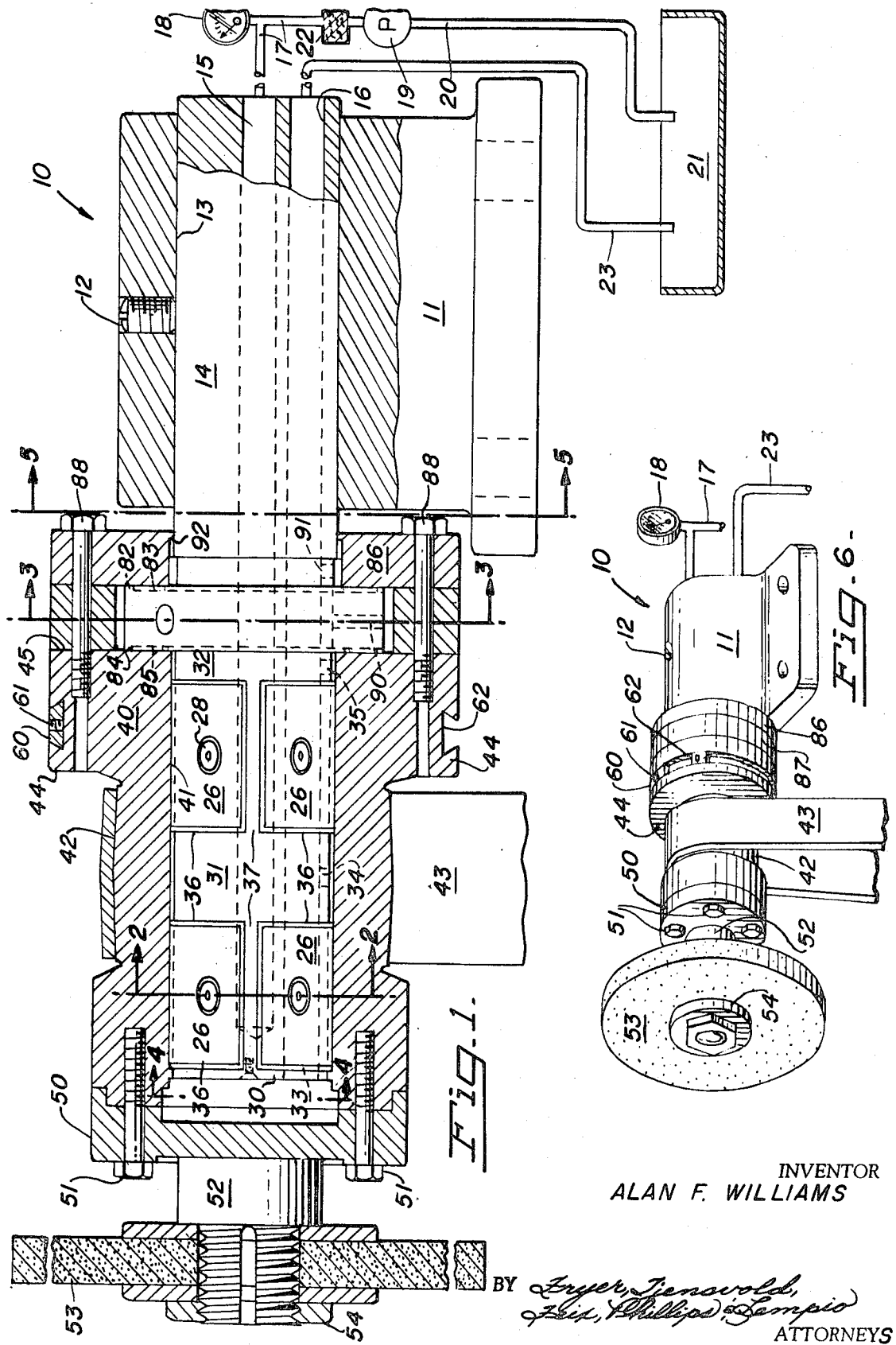

United States Patent Office 3,570,191
Patented Mar. 16, 1971

3,570,191
HYDROSTATIC SPINDLE
Alan F. Williams, Palo Alto, Calif., assignor to Tydeman Machine Works, Inc., Redwood City, Calif.
Filed Apr. 22, 1969, Ser. No. 818,364
Int. Cl. B24b 5/10; F16c 35/08
U.S. Cl. 51—134.5
19 Claims

ABSTRACT OF THE DISCLOSURE

A construction for a hydrostatic spindle journal with an included thrust bearing employs a stationary shaft having a plurality of hydrostatic fluid support bearing pads milled in its outer surface with each bearing pad supplied with a source of pressurized fluid and a tubular sleeve rotatably mounted on the shaft which carries the working element of the spindle. The shaft also includes an integral thrust disc which is received in a circular recess in the tubular sleeve and provides, through similar bearing pads in its radial surfaces, an axial hydrostatic thrust bearing for the tubular sleeve.

BACKGROUND OF THE INVENTION

Hydrostatic bearings are normally contrasted to hydrodynamic or squeeze type bearings since the former is really a system in which the relatively moving parts of the bearings are actually separated by a load carrying film of pressurized fluid. Thus, in a hydrostatic bearing, its load carrying capacity is determined by the pressurized fluid employed in the bearing and also in the design and construction of the individual bearing pads. By controlling the fluid pressure, loads within the structural capabitlies of the bearing structure can be supported in a bearing in which little or no wear occurs.

In order to achieve the film "floating effect" in a hydrostatic bearing, a certain amount of the pressurized fluid must escape around the bearing support bearing pads to which the fluid is supplied. Thus, it is necessary to replenish the fluid lost from the pad in order to maintain the supporting pressure within each individual supporting pad. Various restricting devices are used in the fluid supply lines to each pocket to control the flow of replenishing fluid to the bearing pad and parameters must be carefully designed to achieve the desired dynamic response.

Dynamically, these bearings respond to changes in loading since increased loading on the bearing tends to reduce the clearance between the several parts of the bearing, normally referred to as the runner and a pocket or recess forming the bearing pad, and cause a pressure increase. This reduction in clearance will reduce the leakage around the edges of the pads, and effect an increase in the pressure within such pads, within pressure capacity of the fluid supply system, thereby increasing the load carrying capability. Of course, if the runner simultaneously increases its clearance relative to some of its other pads, more of the fluid will escape from them due to the increased clearance between the respective parts which will tend to cause the pressure in these other pads to reduce as a result of the action of the restricting device in the fluid supply to these other pads.

Normally, in a shaft system, a series of bearing pads are located circumferentially inside a sleeve housing in which a rotating shaft is mounted, so that the pads will tend to "float" the rotating shaft therein on a fluid film. Thus, by referring to the above discussion, it can be appreciated as the shaft moves toward some of its pads, it will cause the pressure in such pads to increase, and as this occurs, the clearances between the shaft and the other remaining pads in the sleeve housing will increase which will result in a decrease in the pressure in such pads. As a result, a hydrostatic bearing is self righting; i.e., develops forces to return to its initial relationships (clearances) between the runner and the several pads as a result of the combination of hydraulic effects acting on the shaft. It should be appreciated that any movement toward or away from the several pads in such a system is extremely minute.

In the machine tool area, hydrostatic bearings are often employed since they provide many advantages over other types of bearings. Values as low maintenance, and almost zero wear are obtained since the respective parts normally are free of physical contact being separated by a pressurized fluid film. Even though such bearings have a high initial cost because they must be manufactured to relatively close tolerances and require a fluid supply system, their long service life still makes them extremely desirable. In other applications, their superior performance characteristics may be required. Thus, an objective of the current invention is to provide improved, lower cost for hydrostatic bearings for machine tools and, in particular for the employment in headstocks, spindles and similar devices of precision equipment.

As indicated above, the hydrostatic bearing is actually a part of a system in which pressurized fluid is continually supplied to its pads where controlled leakage occurs. As a result in conventional hydrostatic bearing designs wherein the pads are located circumferentially around the inside of a stationary sleeve housing supporting a rotating shaft, the fluid leaking from around the several pockets must be vented in some manner so it drains from the bearing area. Usually, it is drained from the ends of the sleeve and with high speed shafts, these devices tend to "throw" a great deal of oil. Further, while prior art hydrostatic bearing designs radially support the rotating shaft member, they often require an associated mechanical thrust bearing to absorb any axial thrust loadings, such as might be found in a headstock or in a precision grinder spindle, wherein extreme accuracy is required. Along with the problem of controlling the leaking fluid in the prior art designs, there are difficulties in the manufacture of such bearings since cutting the pockets on the curved internal surfaces of the sleeve housing both is time consuming and expensive. Symmetry in such milling is difficult to maintain and the preservation of sharp definitions of the edges (sills) of the pads for accurate bearing performance, is extremely difficult to maintain. Further, space requirements for cutting such recesses or pockets limits these bearing design to the larger sizes.

In addition to the problems mentioned above, the prior art hydrostatic bearings employed in headstocks or similar devices often develop difficulties due to the lack of temperature compensation. Often the stationary sleeve housing supporting the shaft experiences increased temperatures while the rotating shaft itself remained relatively cool. This often results in increased clearances between the shaft (i.e., the runner) and the several pad areas as the sleeve housing increases in diameter as a result of thermal expansion. These increased clearances contribute to excessive loss of fluid from the pads and decrease bearing performance. In extreme cases, the bearing can fail due to this type of thermal expansion since the fluid supply system may not be able to maintain the necessary pressures for supporting the loads involved with such increased clearances. Also, considerable difficulty exists in such prior art hydrostatic bearings with regard to providing a suitable bearing structure for thrust loadings since the contrasting axial thermal expansion of the sleeve housing and rotating shaft makes it difficult to employ cooperating axial thrust bearings.

The current invention overcomes many of the problem areas mentioned above and will provide superior spindle journals and the like, for machine tools. Besides offering superior rigidity, the novel spindle journal in a grinder environment can produce improved surface finishes having a roundness capacity within 5 millionth TIR through a spindle speed range from zero to 100,000 r.p.m. Such a spindle will have a spring stiffness up to 20,000,000 pounds throughout its full speed range and all wheel bounce and chatter is eliminated by the design along with any necessity for lubrication and adjustment. With a 60 grit wheel, balanced directly on the spindle journal, as shown in the instant application, two to three microinch finishes are easily obtainable without difficulty.

SUMMARY OF THE INVENTION

An improved hydrostatic spindle journal, in combination with a supporting structure, includes a stationary shaft mounted in a cantilevered manner in the support structure and having internal pressure and drain passages with the pressure passage connected to a source of pressurized fluid, a plurality of bearing pads formed in the outer surface of the shaft with each of said pads having fluid communication with the pressure passage, a plurality of drain areas formed in the outer surface of the shaft having communication with the drain passage and a tubular sleeve member rotatably mounted on the cantilevered portion of said shaft so as to encompass said pads and drain areas whereby said tubular sleeve member will be supported on a full hydrostatic bearing when a source of pressurized fluid is supplied to the pressure passage. The shaft may also include an integral, radially projecting disc received in a circular recess in the tubular sleeve for providing a double acting thrust bearing through utilization of bearing pads and drainage areas formed on both radial faces of the disc so that an axial hydrostatic, thrust bearing is incorporated in the new spindle journal.

BRIEF DESCRIPTION OF THE DRAWINGS

The present invention will be more easily understood from a detailed description of the preferred embodiment, taken in conjunction with the attached drawings wherein:

FIG. 1 is a vertical section through the hydrostatic spindle journal for a grinder constructed according to the invention;

FIG. 6 is a perspective of the complete spindle journal with a grinding wheel attached.

DESCRIPTION OF THE PREFERRED EMBODIMENT

Figure 4:
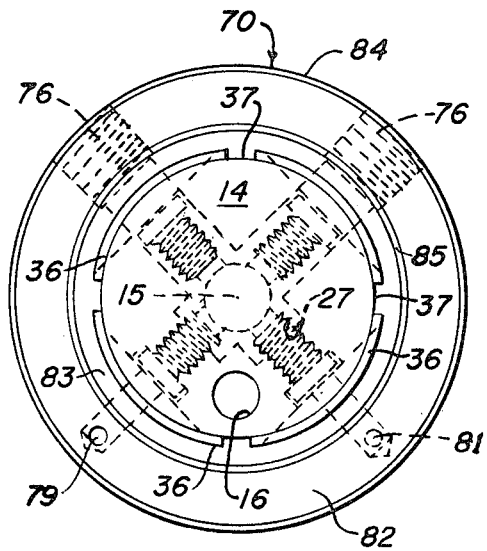
FIG. 4 is an end view of the shaft and disc forming the supporting structure for the rotating member along line 4—4 of FIG. 1.
Figure 2:
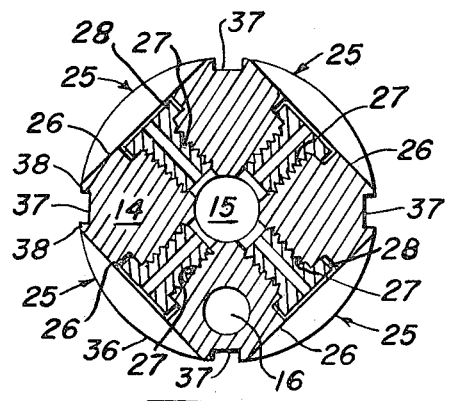
FIG. 2 is a cross-section of a pad area of the hydrostatic bearing taken along line 2—2 of FIG. 1.
Figure 5:
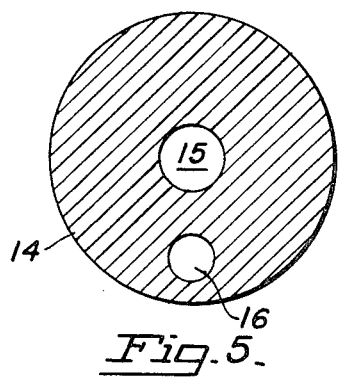
FIG. 5 is a cross-section of the support shaft along line 5—5.

In FIG. 1, a cantilevered grinding spindle assembly 10 is shown supported in a stationary base member 11 which can be mounted on an appropriate machine tool (not shown) such as a lathe or grinder. A set screw 12 in the base member extends into a bore 13 and locks a stationary shaft 14 in the bore so that a substantial portion thereof extends in a cantilevered fashion. This stationary shaft forms the stationary part of the novel bearing and can be suitably supported in other ways, the base member being shown only by way of example.

Since the instant spindle journal is a completely "closed" hydrostatic bearing system, two axial passages, a pressure passage 15 and a drain passage 16, are drilled axially in the stationary shaft 14 which are provided for fluid ingress and egress. The pressure passage is connected through conduit 17, having a gauge 18, to a pump 19, which has its inlet 20 connected to reservoir 21. A filter 22 is provided to insure proper bearing performance.

Thus, the pressure passage which extends substantially the length of the shaft is supplied with a source of pressurized fluid for the hydrostatic spindle journal of the instant invention and the drain passage returns the fluid to the reservoir via a conduit 23.

In outer surface the cantilevered portion of shaft 14, a plurality of pads or lands 25 are formed, usually by directly milling the outer surface of the shaft. In the embodiment shown, a series of flats 26 was cut on equal circumferential spacings at intervals along the shaft. At least three such flats equally spaced circumferentially, would be required for the instant spindle and four or more in each circular grouping will provide better dynamic stability of the spindle journal. Obviously, a larger number of separate groupings can be employed at intervals along the shaft as required. Two such groupings are shown in FIG. 1.

A threaded radial bore 27 in the central portion of each flat connects it with pressure passage 15 and a threaded plug 28 with a properly sized orifice is inserted in each bore to control the amount of fluid flowing from the pressure passage to the associated flat. Utilization of the replaceable plugs makes replacement and maintenance of the spindle a simple matter especially when plugging of an orifice occurs which can affect the dynamic performance of the spindle journal. Further, while the above discussion has reference to milling flats on the outer surface of a shaft, it should be appreciated that the actual recess configuration is not critical.

Subsequent to the formation of flats 26 in circumferential groupings on the shaft, it is turned down in areas 30, 31 and 32 to form the drain areas which are in communication with drain passage 16 through ports 33, 34, and 35. When the shaft is milled to form these drain areas, raised circumferential sills 36 are formed along the edges of the flats. Thereafter, axial grooves 37 are cut between adjacent flats in each circular grouping which separate the circumferential sills into a plurality of segments and also forms a plurality of raised axial sills 38 cooperating with these remaining segments of the circumferential sills to form a raised rectangular sill about each pad or flat, as can be seen in FIG. 1.

It is important to recognize that the resulting rectangular raised sill about each pad can be very accurately dimensioned and sharp edged definition can be maintained due to the manner in which the sills are formed and the ability to accomplish the milling operations directly on the outer surface of the shaft 14. Further, the size of the bearing system constructed according to this invention can be considerably smaller than prior art designs, without loss of its superior performance since the milling operations are carried out on the external surfaces of shaft 14, rather than on the internal surface of a sleeve.

The runner of the hydrostatic bearing, forming part of the spindle journal, is formed by a tubular member 40 with an accurately sized internal bore 41 which is received on the end of the cantilevered portion of shaft 14 so that it surrounds the several circular groupings of flats 26. Each of the flats, as indicated, are surrounded by a rectangular raised sill whose curvature accurately matches the curvature of the bore of the tubular sleeve member, as illustrated in FIG. 1.

In the embodiment in FIG. 1, the tubular sleeve 40 includes a pulley drive surface 42 through which the sleeve is rotated with belt 43 for powering the spindle. It should be appreciated that the spindle could also be powered by an axial drive shaft (not shown) extending through pressure passage 15 (with suitable seals and journals) and connected to an end plate 50 which closes the outboard end of tubular sleeve 40, being attached thereto with bolts 51. Located on the end plate is a tool support, in the instant illustration, an arbor 52 for mounting grit wheel 53 secured with nut 54. It is simple to utilize different tool supports by merely having several end plates with the appropriate structures incorporated thereon for the different tool supports and substituting one end plate for another.

From the above description, it can be appreciated that the end plate closes the end of the tubular sleeve 40 and thereby forms a "closed" radial hydrostatic bearing system for the spindle journal. Thus, pressurized fluid in pressure passage 15 is communicated to the pockets (flats 26) through the orifices in plugs 28 and "leaks" over the associated raised rectangular sill surrounding each of the flats to the draining areas from whence it returns to reservoir 21 via ports 33, 34, and 35 and the drain passage 16. Two important advantages are thereby obtained—one is that high speed operation is possible with the spindle journal without oil being distributed profusely in adjacent areas; and two, the unit tends to be thermally compensated since the shaft 14 with the oil passing therethrough stabilizes quickly in temperature and the tubular sleeve acts as a heat sink. By comparison, the instant spindle journal operates considerably cooler than prior art hydrostatic bearings used in similar operations, operating essentially at a constant temperature over its full speed range, and at a temperature which is never so high that the spindle is uncomfortable to touch for extended periods with a small cooler in the fluid supply system.

For accurate work, a working element, such as the grinding wheel 53 illustrated, can be balanced directly on the tubular sleeve 40 by shifting balancing weights 60, locked with a set screw 61, in a circumferential groove 62 in a hub portion 44 of the tubular sleeve. This technique of balancing the working element and spindle together represents a substantial advantage over prior art balancing techniques, as well as a substantial convenience.

The foregoing described spindle journal represents a greatly improved hydrostatic spindle journal, but one that does not include an axial thrust bearing. It can be employed with mechanical thrust bearings. In those environments wherein a superior hydrostatic thrust bearing is desired, the spindle journal can be modified as hereinafter described to provide a double acting axial thrust bearing for a working tool or element.

Figure 3:
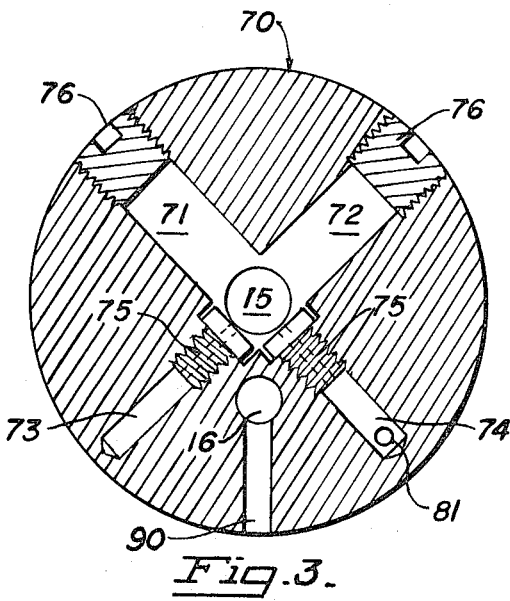
FIG. 3 is a cross-section of a portion of the hydrostatic thrust bearing taken along the line 3—3 of FIG. 1.

A double acting thrust bearing of the hydrostatic type is conveniently incorporated in the novel spindle journal of this invention by the structures shown in FIGS. 1, 3 and 4. For this unique thrust bearing, a radial, extending disc 70 is integrally formed with shaft 14 adjacent to a portion of the shaft supported in the base member 11. This radial disc is drilled from its periphery to form bores 71 and 72 which intersect pressure passage 15 and terminate in smaller diameter blind bores 73 and 74, respectively. A removable plug 75 with an appropriately sized orifice is inserted in these bores so that it controls the flow of pressurized fluid from the pressure passage to the associated blind bore (see FIG. 3) when sealing plugs 76 are received in the mouth of each of these bores, 71 and 72. One of the blind bores 73 is in communication with one radial face 78 of the disc through a port 79 while the other face 80 is in communication with blind bore 74 through port 81.

Normally, the radial faces of the disc are both turned so that a wide circumferential groove 82 is formed near the outer periphery of each radial face, 79 and 80, of disc 70. A smaller circumferential groove 83 is also turned in each radial face adjacent to the shaft 14 so that the net result of these operations will be to form two circumferential, raised sill portions 84 and 85 on each face of the disc. As a result, an outer circumferential sill 84 and an inner circumferential sill 85 on each face enclose a recessed area on each side of the disc one of which is in communication with pressure passage 15, on one face through port 79 on the other face through port 81. (See FIG. 4.)

With the above mentioned disc integrally formed on the shaft when tubular member 40 is received on the cantilevered end of shaft 14, a radial surface 45 of hub 44 will be contiguous to one side of the disc and a cover plate 86 with an opening for shaft 14 will be contiguous to the opposite side of the disc, so a hollow spacer 87 therebetween will provide the proper clearance between these several radial surfaces. Bolts 88 join the cover plate and spacer with the hub, as can be seen in FIG. 1, enclosing the disc.

Thus, through the above arrangement, two circumferential recesses 82, one on opposite radial faces 78 and 80 of disc 70 will provide circular pressurized recesses for forming the axial, double acting, thrust bearing in the instant spindle. If the tubular member is displaced axially on shaft 14, it will tend to increase the pressure in one circumferential recess 82 to absorb thrust forces and allow the pressure to decrease in the other. Thus, in essence, the hydrostatic thrust bearing operates in the same fashion as the radial support journal previously described.

Further, this radial thrust bearing is substantially unaffected by change in temperatures because of the narrow width of the disc and generally common temperature of the spaces. Fluid escaping over the outer circumferential sills 84 of the disc is recovered from the area between the periphery of the disc 70 and the spacer through a radial drain passage 90 connected to drain passage 16. Similarly, the leakage across the inner circumferential sills 85 is recovered through port 35 or port 91 which are in communication with reduced portions of shaft 14 forming drainage areas on opposite sides of the disc from which fluid can drain directly to passage 16. Cover plate 86 includes an aperture 92 which forms a seal about shaft 14 to prevent the escape of oil, thereby completing closure of the bearing system.

Thus, the above description discloses an improved, new hydrostatic spindle wherein substantial advantages can be obtained.

Also, it is possible to use the shaft described above as the rotating member in a "closed" system if manifolds are provided at one end of the shaft to provide for fluid ingress and egress while the shaft is rotating. This could be accomplished by two separate grooves in the shaft, one connected with each passageway so circular manifolds could provide for continuous circulation of fluid. Seals would be required at both ends of the shaft.

What is claimed is:

1. An improved spindle journal with a cantilevered hydrostatic bearing in combination with supporting structures, comprising:
 a stationary shaft member mounted in the supporting structure, said shaft having two separate passages formed therein;
 a source of pressurized fluid connected to one of said passages and a drain connected to the other of said passages;
 a plurality of bearing pads formed in the outer surface of said shaft member, each of said bearing pads having a fluid communication connection with said one passage connected to said source of pressurized fluid;
 a plurality of drain areas in the outer surface of said shaft member contiguous to said bearing pads, said drain areas having fluid communication with said other passage connected to said drain;
 a cylindrical spindle member having a bore, said spindle member rotatably mounted on said shaft so said bearing pads and said drain areas are located within said bore; and
 tool holding means associated with said spindle member whereby a tool mounted in such means will be supported on a hydrostatic bearing when said spindle member is driven.

2. The improved spindle journal described in claim 1 wherein the stationary shaft member is cantilevered from the supporting structures and the bearing pads and drain areas are located on the cantilevered portion of said stationary shaft.

3. The improved spindle journal as defined in claim 1 wherein the two separate passages in the stationary shaft member are axial passages.

4. The improved spindle journal as defined in claim 1 wherein each of the bearing pads includes a flow control device in its fluid communication connection with the passage connected to the source of pressurized fluid.

5. The improved spindle journal as defined in claim 4 wherein the flow control device is an orifice device.

6. The improved spindle journal as defined in claim 1 wherein the plurality of bearing pads are equally spaced circumferentially about the stationary shaft at, at least, two spaced axial locations.

7. The improved spindle as defined in claim 6 wherein at least three individual bearing pads are circumferentially disposed at each spaced axial location.

8. The spindle journal as defined in claim 1 wherein the stationary shaft member includes an integral radial disc and the cylindrical spindle member includes a recess for receiving said disc, said recess having parallel surfaces contiguous to the opposite sides of said disc, and said disc having bearing pads and drain areas on each side, said bearing pads connected to the one passage connected to the source of pressurized fluid and said drain areas connected to the other passage connected to drain whereby the spindle journal is provided with an axial thrust bearing which is operable in either direction of axial displacement of said cylindrical spindle member relative to said stationary shaft member.

9. The improved spindle journal as defined in claim 8 wherein the bearing pads on the radial disc member include a circumferential pad having a circular recess.

10. The improved spindle journal as defined in claim 9 wherein each bearing pad connection in the radial disc to the one passage connected to the source of pressurized fluid includes a flow control device.

11. An improved spindle journal employing a hydrostatic bearing system comprising:
a shaft member, said shaft having two separate passages formed therein;
means for connecting a source of pressurized fluid to one of said passages and means for connecting a drain to the other of said passages;
a plurality of bearing pads formed in the outer surface of said shaft member, each of said bearing pads having a fluid communication connection with said one passage connected to said source of pressurized fluid;
a plurality of drain areas in the outer surface of said shaft member contiguous to said bearing pads, said drain areas having fluid communication with said other passage connected to said drain;
a cooperating member having a bore, said cooperating member arranged with said shaft so said bearing pads and said drain areas are located within said bore with said cooperating member and said shaft member being relatively rotatable; and
tool holding means associated with the rotating member whereby a tool mounted in such means will be supported on a hydrostatic bearing when driven.

12. The improved spindle journal as defined in claim 11 wherein the two separate passages in the shaft member are axial passages.

13. The improved spindle journal as defined in claim 11 wherein each of the bearing pads includes a flow control device in its fluid communication connection with the passage connected to the source of pressurized fluid.

14. The improved spindle journal as defined in claim 13 wherein the flow control device is an orifice device.

15. The improved spindle journal as defined in claim 11 wherein the plurality of bearing pads are equally spaced circumferentially about the shaft member at, at least, two spaced axial locations.

16. The improved spindle as defined in claim 15 wherein at least three individual bearing pads are circumferentially disposed at each spaced axial location.

17. The spindle journal as defined in claim 11 wherein the shaft member includes an integral radial disc and the cooperating member includes a recess for receiving said disc, said recess having parallel surfaces contiguous to the opposite sides of said disc, and said disc having bearing pads and drain areas on each side, said bearing pads connected to the one passage connected to the source of pressurized fluid and said drain areas connected to the other passage connected to drain whereby the spindle journal is provided with an axial thrust bearing which is operable in either direction of axial displacement of said cooperating member relative to said shaft member.

18. The improved spindle journal as defined in claim 17 wherein the bearing pads on the radial disc member include a circumferential pad having a circular recess.

19. The improved spindle journal as defined in claim 18 wherein each bearing pad connection in the radial disc to the one passage connected to the source of pressurized fluid includes a flow control device.

References Cited
UNITED STATES PATENTS 3,383,805  5/1968  Powell _____ 51—134.5
3,493,273  3/1970  Greenberg _____ 308—9

THERON E. CONDON, Primary Examiner

E. F. DESMOND, Assistant Examiner

U.S. Cl. X.R.

308—9